(12) United States Patent
Johnson et al.

(10) Patent No.: US 8,494,889 B2
(45) Date of Patent: Jul. 23, 2013

(54) OPTIMIZED MAINTENANCE SCHEDULES BASED ON SMART CITY MAINTENANCE PROFILES

(75) Inventors: Conrad James Johnson, Pflugerville, TX (US); Andrew Jason Lavery, Austin, TX (US); James Michael Pavlovsky, Cedar Park, TX (US); Lorin Evan Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 13/159,945

(22) Filed: Jun. 14, 2011

(65) Prior Publication Data
US 2012/0323615 A1 Dec. 20, 2012

(51) Int. Cl.
*G06F 9/46* (2006.01)
(52) U.S. Cl.
USPC ..................................................... 705/7.12
(58) Field of Classification Search
USPC ..................................................... 705/7.12
See application file for complete search history.

(56) References Cited

U.S. PATENT DOCUMENTS

| | | | |
|---|---|---|---|
| 6,292,723 B1 | 9/2001 | Brogan et al. | 701/29 |
| 7,330,819 B2 | 2/2008 | Sinex | 705/4 |
| 7,487,029 B2 * | 2/2009 | Feeney et al. | 701/100 |
| 7,746,794 B2 | 6/2010 | Sink | 370/245 |
| 8,157,078 B1 * | 4/2012 | Folk et al. | 194/206 |
| 2003/0004598 A1 | 1/2003 | Morris | 700/116 |
| 2007/0044539 A1 | 3/2007 | Sabol et al. | 73/19.01 |
| 2007/0255457 A1 | 11/2007 | Whitcomb et al. | 700/273 |
| 2008/0140259 A1 * | 6/2008 | Bash et al. | 700/278 |
| 2008/0202022 A1 | 8/2008 | Hanks | 44/605 |
| 2008/0255899 A1 | 10/2008 | McConnell et al. | 705/7 |
| 2010/0087963 A1 * | 4/2010 | Boston et al. | 700/295 |
| 2010/0277307 A1 | 11/2010 | Horton et al. | 340/539.11 |
| 2010/0286937 A1 | 11/2010 | Hedley et al. | 702/60 |
| 2010/0324956 A1 | 12/2010 | Lopez et al. | 705/7 |

FOREIGN PATENT DOCUMENTS

WO  WO 2009027110  3/2009

OTHER PUBLICATIONS

Ilic et al., "Using Sensor Information to Reduce the Carbon Footprint of Perishable Goods," Pervasive Computing, Published by the IEEE CS, Jan.-Mar. 2009.
Jessop, "Integrated Shipboard and Shore-Based Maintenance Management Decision Tool," Impact Technologies, Dec. 2009.
Ogando, "Rolls-Royce's Engine for the More Electric 787 Dreamliner Takes Flight," Design News, Jun. 29, 2007.
"Maintenance assistant embedded in HVAC drive," ABB, 2011.
"Fleet Maintenance Pro for Windows," Innovative Maintenance Systems, 1994-2009.
"Equipment Maintenance—Tracking Made Easy," Quantum Software Solutions, Inc., 2009.
"The ScanGaugeII With XGauge," Linear-Logic, 2004.
"Windows Embedded Automotive 7 Solutions," Microsoft, 2011.

* cited by examiner

*Primary Examiner* — Romain Jeanty
(74) *Attorney, Agent, or Firm* — VanLeeuwen & VanLeeuwen; Jeffrey S. LaBaw

(57) ABSTRACT

An approach is provided in which a maintenance optimizer receives a policy change threshold that corresponds to a system. The maintenance optimizer monitors real-time condition data associated with the system, and determines whether the real-time condition data has reached the policy change threshold. If the real-time condition data has not reached the policy change threshold, the maintenance optimizer generates a maintenance operation notification based upon the real-time condition data according to a maintenance schedule policy. However, if the real-time condition data has reached the policy change threshold, the maintenance optimizer generates an alternate maintenance operation notification based upon the real-time condition data according to an alternate maintenance schedule policy.

17 Claims, 8 Drawing Sheets

Maintenance Schedule Policy
300

Replace Part X Every 6 months
Replace Part Y Every 12 months
Replace Part Z Every 12 months

*FIG. 3A*

Alternate Maintenance Schedule Policy
310

Replace Part W Every 1 month
Replace Part X Every 2 months
Replace Part Y Every 6 months
Replace Part Z Every 12 months

*FIG. 3B*

OPTIMIZED MAINTENANCE SCHEDULES BASED ON SMART CITY MAINTENANCE PROFILES

BACKGROUND

The present disclosure relates to generating maintenance notifications according to different maintenance schedule policies. More particularly, the present disclosure relates to selecting an alternate maintenance schedule policy when a system's real-time condition data reaches one or more policy change thresholds.

Systems typically require component maintenance according to a particular maintenance schedule. Some system owners may choose to forgo system maintenance in an attempt to reduce overall operational costs. Other system owners may wish to maintain their equipment according to the manufacturer's recommended levels. Since system owners have different opinions on how they maintain their equipment, system manufacturers have difficulty in communicating individualized maintenance information to the system owners.

BRIEF SUMMARY

According to one embodiment of the present disclosure, an approach is provided in which a maintenance optimizer receives a policy change threshold that corresponds to a system. The maintenance optimizer monitors real-time condition data associated with the system, and determines whether the real-time condition data has reached the policy change threshold. If the real-time condition data has not reached the policy change threshold, the maintenance optimizer generates a maintenance operation notification based upon the real-time condition data according to a maintenance schedule policy. However, if the real-time condition data has reached the policy change threshold, the maintenance optimizer generates an alternate maintenance operation notification based upon the real-time condition data according to an alternate maintenance schedule policy.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 3A is a diagram showing a maintenance schedule policy;

FIG. 3B is a diagram showing an alternative maintenance schedule policy;

DETAILED DESCRIPTION

Figure 1:
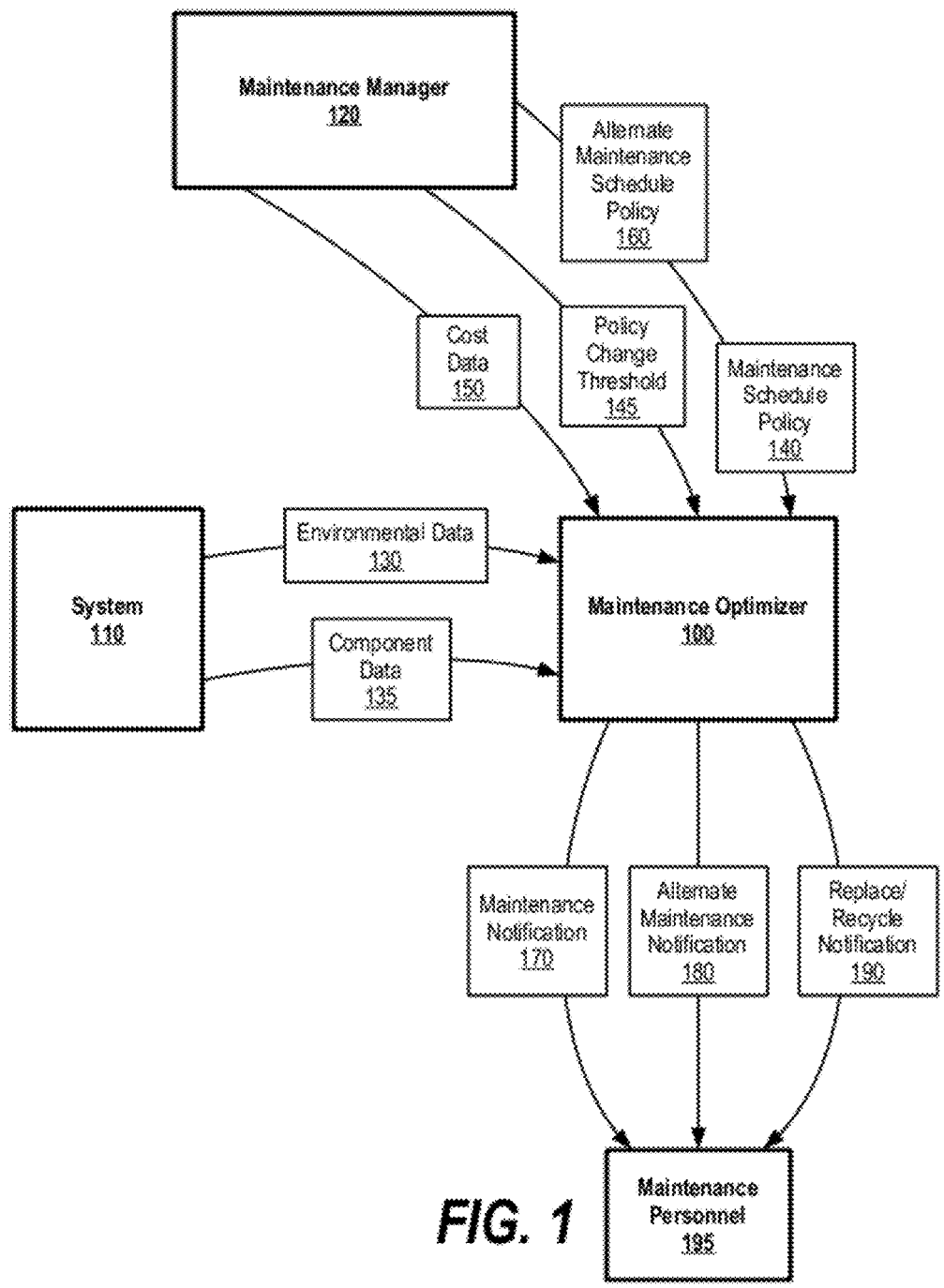
FIG. 1 is diagram showing a maintenance optimizer monitoring a system's real-time condition data and sending maintenance notifications to maintenance personnel.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is diagram showing a maintenance optimizer monitoring a system's real-time condition data and sending maintenance notifications to maintenance personnel. Maintenance optimizer 100 selects a maintenance schedule based upon policy thresholds and real-time condition data and distributes maintenance notifications 170-190 to maintenance personnel 195 accordingly.

Maintenance optimizer 100 receives maintenance schedule policy 140 from maintenance manager 120. Maintenance schedule policy 140 includes information that indicates, for example, component change intervals at which to replace components on system 110 (e.g., air filters, spark plugs, etc., see FIG. 3A and corresponding text for further details). In one embodiment, maintenance manager 120 provides maintenance schedule policy 140 real-time over a wireless network. In another embodiment, maintenance optimizer 100 retrieves maintenance schedule policy 140 from local memory that maintenance manager 120 occasionally updates. In another embodiment, system 110 may be a transportation vehicle such as an automobile, a truck, a train, an aircraft, etc.

Maintenance optimizer 110 also receives policy change threshold 145, which includes one or more thresholds corresponding to system 110's "real-time condition data." Maintenance optimizer 110 compares the policy change threshold 140 with the real-time condition data in order to determine at point at which to utilize a different (e.g., more "aggressive") maintenance schedule policy 140. System 110's real-time condition data includes environmental data 130, component data 135, and cost data 150. Environmental data 130 may be acquired by sensors included in system 110 (e.g., $CO_2$ level, temperature, altitude, etc., see FIG. 4A and corresponding text for further details). Component data 135 may also be acquired by sensors included in system 110 and include component information such as tire pressure, installation date, tire temperature, etc. (see FIG. 4B and corresponding text for further details). Cost data 150 may be acquired from maintenance manager 120 and includes updated cost information, such as component pricing, installation pricing, resource pricing (e.g., cost of oil and gas), etc. (see FIG. 4C and corresponding text for further details). In one embodiment, maintenance optimizer 100 may occasionally download cost data 150 and store cost data 150 in local memory for real-time access.

Maintenance optimizer 110 monitors the real-time condition data relative to policy change threshold 145. In turn, when the real-time condition data is below policy change threshold 145, maintenance optimizer 100 distributes maintenance notifications 170 to maintenance personnel 195 according to maintenance schedule policy 140 (e.g., replace spark plugs every year). In one embodiment, policy change threshold 145 corresponds to an ambient environmental condition included in environmental data 130, such as system 110's cumulative carbon footprint.

Figure 5:
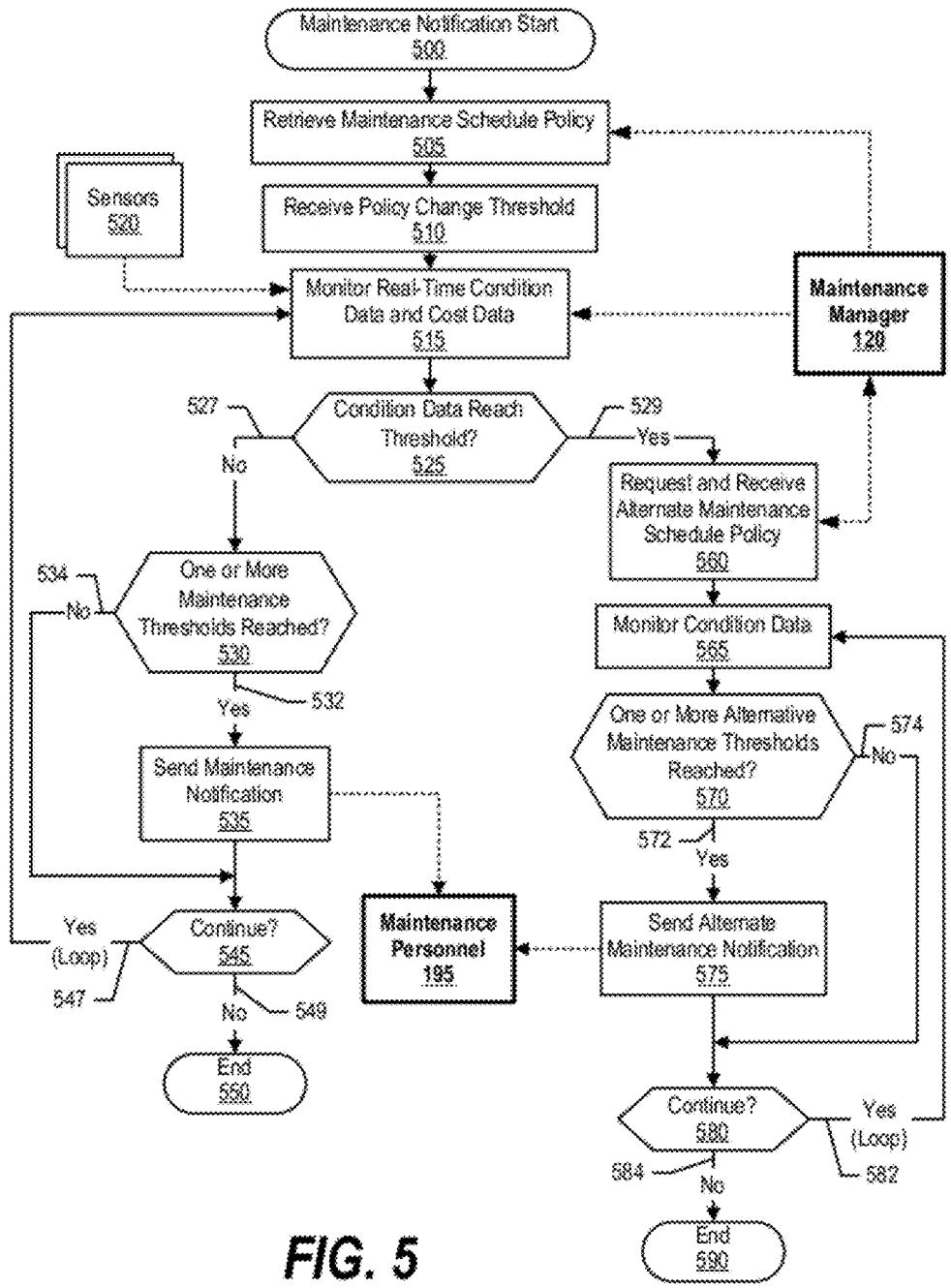
FIG. 5 is a flowchart showing steps taken in monitoring real-time condition data and sending maintenance notifications according to a selected maintenance schedule policy.

When maintenance optimizer 100 determines that one of the real-time condition data reaches one of the policy change thresholds 145, maintenance optimizer 100 retrieves alternate maintenance schedule policy 160 from maintenance manager 120, and generates alternate maintenance notifications 180 according to alternate maintenance schedule policy 160 (see FIG. 5 and corresponding text for further details).

In one embodiment, maintenance manager 100 sends a request to maintenance manager 120 to provide alternate maintenance schedule policy 160. In another embodiment, maintenance optimizer 100 retrieves alternate maintenance schedule policy 160 from a local storage area, which maintenance manager 120 occasionally updates.

In yet another embodiment, maintenance optimizer 100 analyzes overall operational costs against component replacement costs. In this embodiment, maintenance optimizer 100 determines whether to replace particular components and/or replace system 110 altogether by comparing replacement costs against long term operational costs. For example, a component's replacement cost may be $40.00 and system 110's corresponding operational cost savings may be $20 per month. In this example, maintenance personnel 195 may wish to replace the component in order to benefit from the reduced operational costs after two months of service. In this embodiment, maintenance optimizer 100 generates replace/recycle notification 190, which identifies component replacement options (see FIG. 6 and corresponding text for further details).

Figure 2:
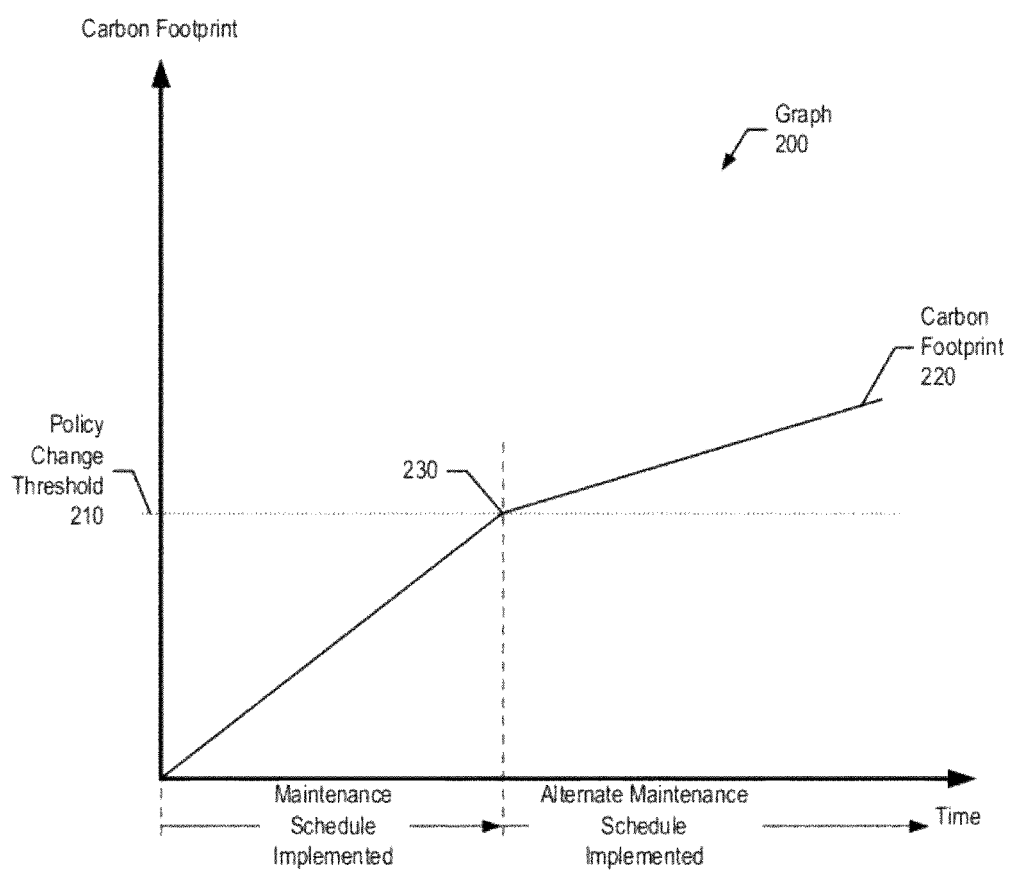
FIG. 2 is a diagram showing a decrease in a system's carbon footprint accumulation rate by changing the system's maintenance schedule.

FIG. 2 is a diagram showing a decrease in a system's carbon footprint accumulation rate by changing the system's maintenance schedule policy. Graph 200 shows a system's carbon footprint 220 over time. The system commences operation using a particular (default) maintenance schedule policy and, as such, the system's maintenance optimizer sends notifications to service the system accordingly. The maintenance optimizer monitors carbon footprint 220 (e.g., through actual measurements or computations), and determines that carbon footprint 220 reaches policy change threshold 210 (e.g., carbon footprint threshold) at time 230. As such, the maintenance optimizer utilizes an alternative maintenance schedule policy to service the system accordingly (e.g., replace components more frequently), causing the system's carbon generation rate to decrease. In turn, the amount of time to reach a maximum carbon footprint threshold is increased.

In one embodiment, the maintenance optimizer tracks the system's total cost of ownership. The total cost of ownership (TCO) is the cost to acquire, operate, maintain, and retire the system at the end of its life. For example, if component X is upgraded and a cost of Y, the upgrade may increase fuel efficiency by Z %. Although component X will continue to function whether it is replaced or not, the system's fuel efficiency improves buy replacing component X. Based on the number of miles driven, the maintenance optimizer may calculate the length of time to recoup the cost Z, based on the savings in fuel efficiency.

FIG. 3A is a diagram showing a maintenance schedule policy. Maintenance schedule policy 300 includes component change interval times for three components (X, Y, and Z). A maintenance optimizer utilizes this policy to send maintenance notifications up until a point when real-time condition data reaches one or more policy change thresholds. At this point, the maintenance optimizer utilizes an alternative maintenance schedule policy to send alternative maintenance notifications, which may include more aggressive component change intervals (See FIGS. 3B, 5, and corresponding text for further details).

FIG. 3B is a diagram showing an alternative maintenance schedule policy. Alternative maintenance schedule policy 310 includes component change intervals for four components (W, X, Y, and Z). As can be seen, comparing policy 310 with policy 300 (FIG. 3A), alternative maintenance schedule policy 310 includes more aggressive, or frequent component change intervals.

Figure 4A:
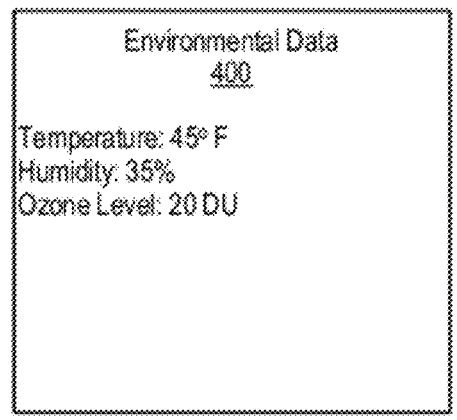
FIG. 4A is a diagram showing environmental data provided by a system, which a maintenance optimizer utilizes during maintenance schedule selection analysis.

FIG. 4A is a diagram showing environmental data provided by a system, which a maintenance optimizer utilizes during maintenance schedule selection analysis. As can be seen, environmental data 400 includes data pertaining to environmental conditions surrounding the system. In one embodiment, a system collects environmental data 400 through sensors and provides environmental data 400 to the maintenance optimizer.

Figure 4B:
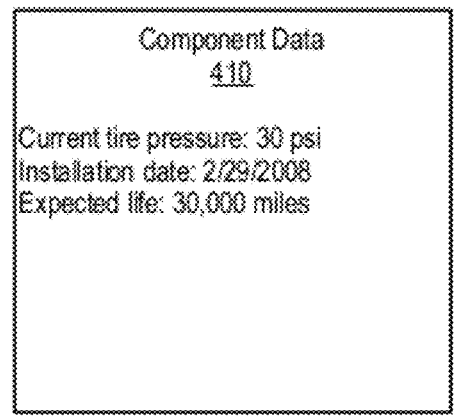
FIG. 4B is a diagram showing component data provided by a system, which a maintenance optimizer utilizes during maintenance schedule selection analysis.

FIG. 4B is a diagram showing component data provided by a system, which a maintenance optimizer utilizes during maintenance schedule selection analysis. As can be seen, component data 410 includes data pertaining to components included in the system. In one embodiment, a system retrieves component data 410 from sensors or local memory, and provides component data 410 to the maintenance optimizer.

Figure 4C:
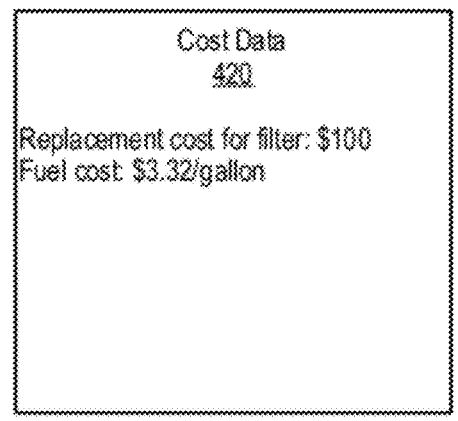
FIG. 4C is a diagram showing cost data, which a maintenance optimizer utilizes during maintenance schedule selection analysis.

FIG. 4C is a diagram showing cost data, which a maintenance optimizer utilizes during maintenance schedule selection analysis. As can be seen, cost data 420 includes operating costs (fuel cost), component costs, and may also include replacement cost (labor). In one embodiment, cost data 420 is received by the maintenance optimizer from a remote maintenance manager, such as maintenance manager 120 shown in FIG. 1.

FIG. 5 is a flowchart showing steps taken in monitoring real-time condition data and sending maintenance notifications according to a selected maintenance schedule policy. A maintenance optimizer selects a particular maintenance schedule policy based upon whether real-time condition data reaches one or more policy change thresholds.

Maintenance optimizer processing commences at 500, whereupon the maintenance optimizer retrieves a maintenance schedule policy at step 505. In one embodiment, the maintenance optimizer retrieves the maintenance schedule policy from local memory. In another embodiment, the maintenance optimizer receives the maintenance schedule policy from maintenance manager 120, which may be local or at a remote location.

At step 510, the maintenance optimizer retrieves a policy change threshold that, when compared with a system's real-time condition data, indicates a point at which to utilize an alternative maintenance schedule for maintenance notifications. The maintenance optimizer monitors the real-time condition data at step 515. In one embodiment, sensors 520 provide the real-time environmental data and component status data, and maintenance manager 120 provides real-time component cost data (see FIGS. 4A-4C and corresponding text for further details).

A determination is made as to whether one or more of the real-time condition data has reached one or more of the policy change thresholds (decision 525). For example, the policy change threshold may indicate a carbon footprint threshold such as 100,000 $CO_2$ and, in this example, the maintenance optimizer determines whether a cumulative carbon footprint has reached this threshold.

If the real-time condition data has not reached one of the policy change thresholds, decision 525 branches to "No" branch 527 whereupon a determination is made as to whether one or more maintenance thresholds have been reached (decision 530). For example, a maintenance threshold may indicate replacing a particular component every six months and, in this example, the maintenance optimizer determines the length of time that the component has been in service. If one or more maintenance thresholds have been reached, decision 530 branches to "Yes" branch 532, whereupon the maintenance optimizer sends a maintenance notification to maintenance personnel 195 to replace one or more components according the maintenance schedule policy (step 535). On the other hand, if a maintenance threshold has not been reached, decision 530 branches to "No" branch 534, bypassing maintenance notification steps.

A determination is made as to whether to continue to monitor real-time condition data (decision 545). If the maintenance optimizer should continue to monitor real-time condition data, decision 545 branches to "Yes" branch 547, which loops back to continue monitoring the real-time condition data. On the other hand, if the maintenance optimizer should terminate, decision 545 branches to "No" branch 549 whereupon the maintenance optimizer ends at 550.

Referring back to decision 525, if one or more of the real-time condition data has reached one or more of the policy change thresholds, decision 525 branches to "Yes" branch 529. At step 560, the maintenance optimizer requests and receives an alternate maintenance schedule policy from maintenance manager 120. In one embodiment, the alternate maintenance schedule policy requires component replacement on a more frequent basis in order to maintain the system at a "near new" condition. In another embodiment, the maintenance optimizer may retrieve the alternate maintenance schedule policy from local memory. In yet another embodiment, the alternate maintenance schedule policy may instruct the maintenance optimizer to terminate the system's operation (e.g., in 24 hours) until maintenance personnel are able to analyze the system.

The maintenance optimizer monitors real-time condition data at step 565, and a determination is made as to whether one or more alternate maintenance thresholds have been reached (decision 570). For example, an alternate maintenance threshold may be more "aggressive" than the maintenance threshold discussed in step 530, and the same component may have a replacement frequency of every three months. If one or more alternate maintenance thresholds have been reached, decision 570 branches to "Yes" branch 572, whereupon the maintenance optimizer sends an alternate maintenance notification to maintenance personnel 195 to replace one or more components according the alternate maintenance schedule policy (step 575). On the other hand, if one of the alternate maintenance thresholds have not been reached, decision 570 branches to "No" branch 574, bypassing maintenance notification steps.

A determination is made as to whether to continue to monitor real-time condition data (decision 580). If the maintenance optimizer should continue to monitor real-time condition data, decision 580 branches to "Yes" branch 582, which loops back to continue monitor the real-time condition data. On the other hand, if the maintenance optimizer should terminate, decision 580 branches to "No" branch 584 whereupon the maintenance optimizer ends at 590.

Figure 6:
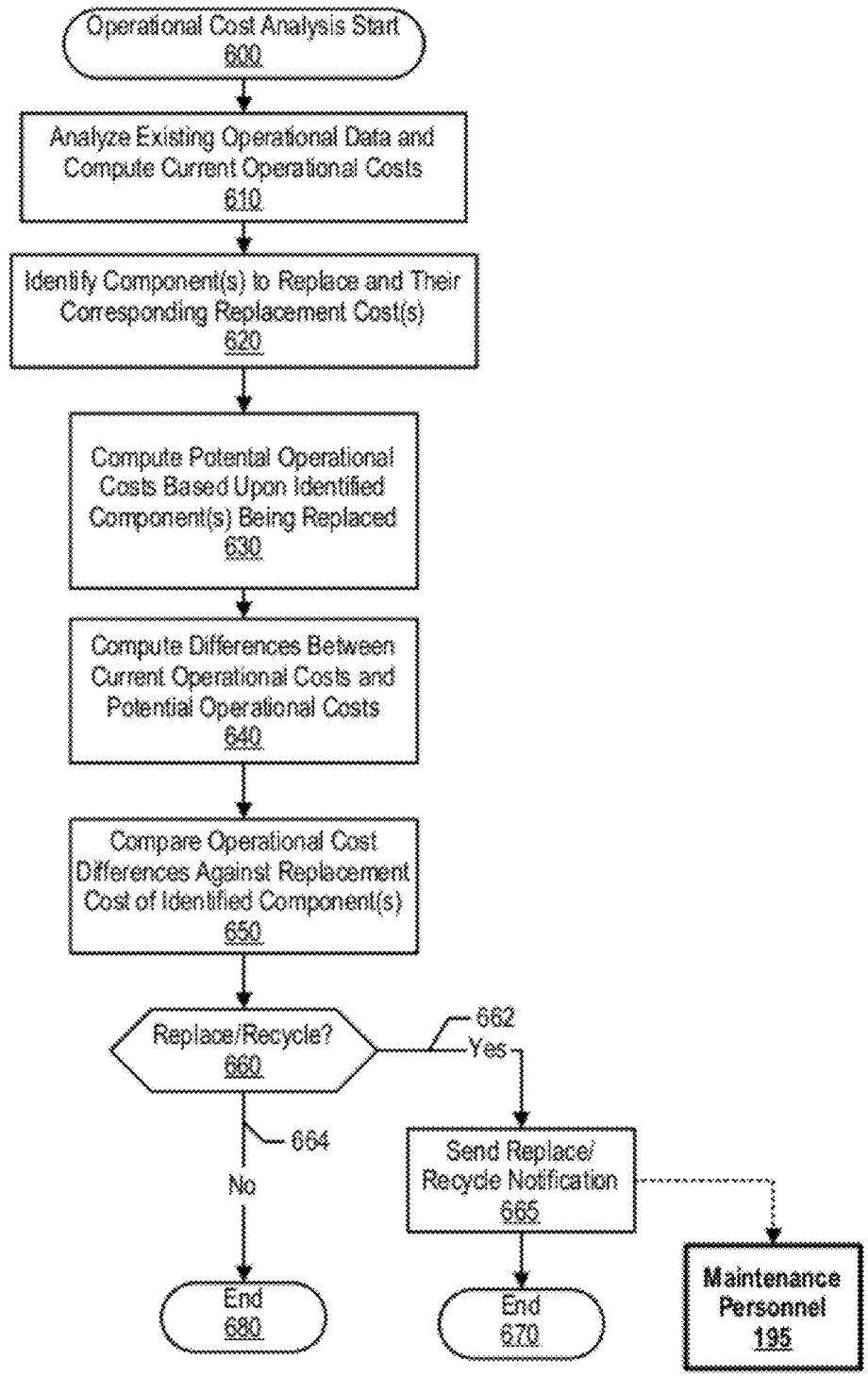
FIG. 6 is a flowchart showing steps taken in replacing/recycling system components in order to reduce the system's overall operational costs.

FIG. 6 is a flowchart showing steps taken in replacing/recycling system components in order to reduce the system's overall operational costs. In one embodiment, maintenance optimizer may be configured to notify maintenance personnel to replace components in order to reduce operational parts. For example, the maintenance optimizer may determine that by replacing an automobile's air filter, the savings from increased fuel efficiency outweighs the cost of the air filter.

Processing commences at 600, whereupon the maintenance optimizer analyzes existing operational data and computes a current operational cost (step 610). For example, the maintenance optimizer may analyze a system's efficiencies (e.g., miles per gallon) and inefficiencies (e.g., tread wear due to worn shock absorbers), and compute operational costs (e.g., cost per mile, early tire replacement costs, etc.) Next, the maintenance optimizer identifies one or more components to be replaced along with their corresponding replacement costs (step 620). For example, the maintenance optimizer may identify ten components to potentially replace and order them from "most likely" to reduce operational costs to "least likely" to reduce operational costs. The maintenance optimizer, at step 630, then computes potential operational costs by replacing one or more of the identified components.

At step 640, the maintenance optimizer computes one or more operational cost differences between one or more current operational costs and one or more potential operational costs. For example, an operational cost difference may correspond to an amount of money a user would save on a weekly basis based upon mileage history and the current price of fuel. Next, the maintenance optimizer compares the operational cost differences against the replacement costs of one or more of the identified devices (step 650). In one embodiment, the maintenance optimizer may compute multiple operational cost differences for multiple components in order to identify which component replacement results in the largest amount of operational savings.

A determination is made as to whether to replace or recycle the component (decision 660). For example, a component's replacement cost may be $40.00 and its corresponding operational cost difference is $20 per month. In this example, a user may wish to replace the component in order to benefit from the reduced operational costs after two months of service. In one embodiment, a determination is made as to whether to recycle or abandon a component. In this example, if current technology for a component has a smaller carbon footprint and a system is reaching a carbon footprint threshold, it may be worthwhile to recycle the current component and replace it with a newer component.

If the comparison in step 650 indicates a component replacement, decision 660 branches to "Yes" branch 662 whereupon the maintenance optimizer sends a replace/recycle notification to maintenance personnel 195 at step 665. The maintenance optimizer ends at 670. On the other hand, if the comparison in step 650 does not indicate a component replacement, decision 660 branches to "No" branch 664 whereupon the maintenance optimizer ends at 680.

Figure 7:
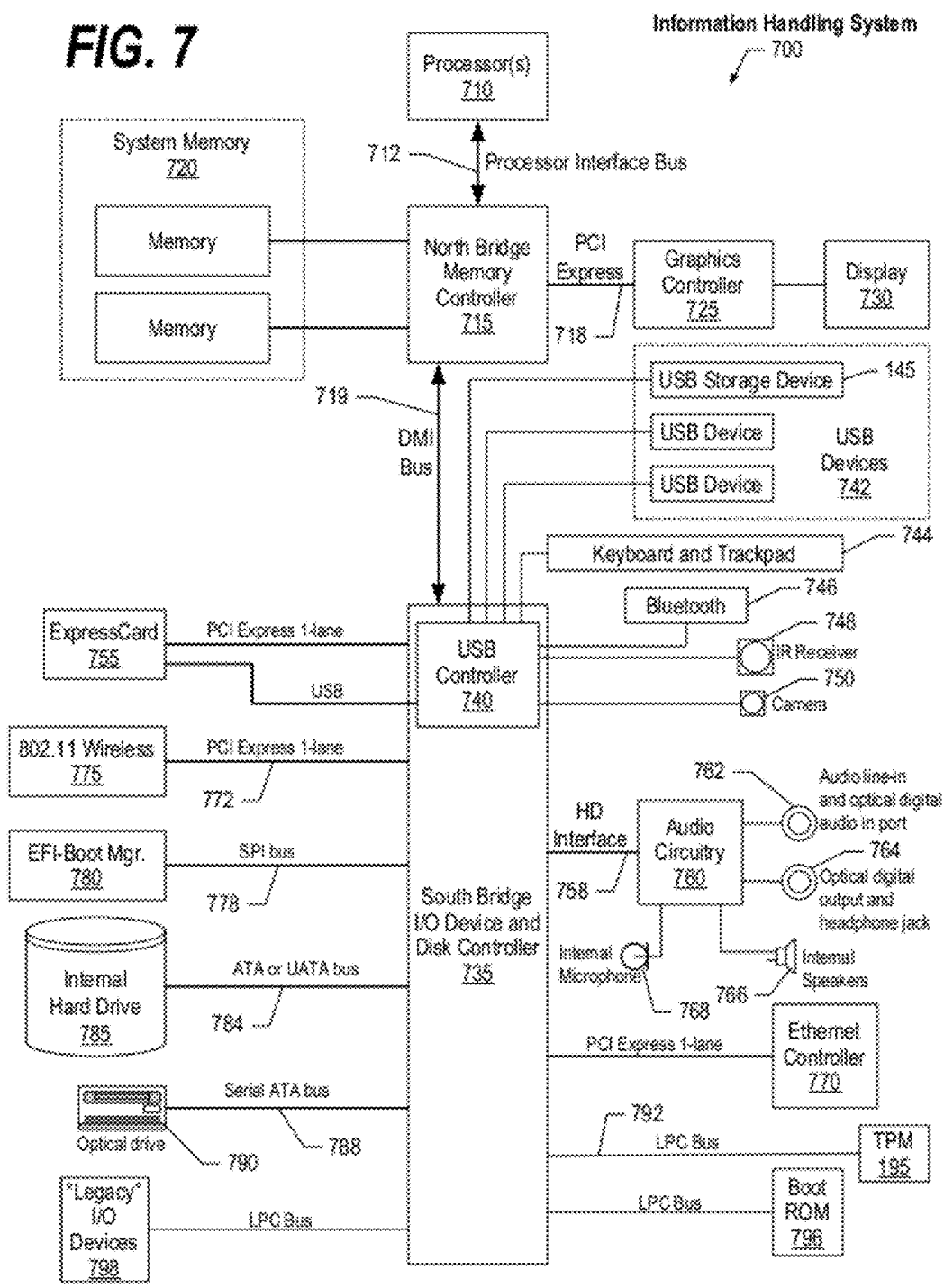
FIG. 7 is a block diagram of a data processing system in which the methods described herein can be implemented.

FIG. 7 illustrates information handling system 700, which is a simplified example of a computer system capable of performing the computing operations described herein. Information handling system 700 includes one or more processors 710 coupled to processor interface bus 712. Processor interface bus 712 connects processors 710 to Northbridge 715, which is also known as the Memory Controller Hub (MCH). Northbridge 715 connects to system memory 720 and provides a means for processor(s) 710 to access the system memory. Graphics controller 725 also connects to Northbridge 715. In one embodiment, PCI Express bus 718 connects Northbridge 715 to graphics controller 725. Graphics controller 725 connects to display device 730, such as a computer monitor.

Northbridge 715 and Southbridge 735 connect to each other using bus 719. In one embodiment, the bus is a Direct Media Interface (DMI) bus that transfers data at high speeds in each direction between Northbridge 715 and Southbridge 735. In another embodiment, a Peripheral Component Interconnect (PCI) bus connects the Northbridge and the Southbridge. Southbridge 735, also known as the I/O Controller Hub (ICH) is a chip that generally implements capabilities that operate at slower speeds than the capabilities provided by the Northbridge. Southbridge 735 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 796 and "legacy" I/O devices (using a "super I/O" chip). The "legacy" I/O devices (798) can include, for example, serial and parallel ports, keyboard, mouse, and/or a floppy disk controller. The LPC bus also connects Southbridge 735 to Trusted Platform Module (TPM) 795. Other components often included in Southbridge 735 include a Direct Memory Access (DMA) controller, a Programmable Interrupt Controller (PIC), and a storage device controller, which connects Southbridge 735 to nonvolatile storage device 785, such as a hard disk drive, using bus 784.

ExpressCard 755 is a slot that connects hot-pluggable devices to the information handling system. ExpressCard 755 supports both PCI Express and USB connectivity as it connects to Southbridge 735 using both the Universal Serial Bus (USB) the PCI Express bus. Southbridge 735 includes USB Controller 740 that provides USB connectivity to devices that connect to the USB. These devices include webcam (camera) 750, infrared (IR) receiver 748, keyboard and trackpad 744, and Bluetooth device 746, which provides for wireless personal area networks (PANs). USB Controller 740 also provides USB connectivity to other miscellaneous USB connected devices 742, such as a mouse, removable nonvolatile storage device 745, modems, network cards, ISDN connectors, fax, printers, USB hubs, and many other types of USB connected devices. While removable nonvolatile storage device 745 is shown as a USB-connected device, removable nonvolatile storage device 745 could be connected using a different interface, such as a Firewire interface, etcetera.

Wireless Local Area Network (LAN) device 775 connects to Southbridge 735 via the PCI or PCI Express bus 772. LAN device 775 typically implements one of the IEEE 802.11 standards of over-the-air modulation techniques that all use the same protocol to wireless communicate between information handling system 700 and another computer system or device. Optical storage device 790 connects to Southbridge 735 using Serial ATA (SATA) bus 788. Serial ATA adapters and devices communicate over a high-speed serial link. The Serial ATA bus also connects Southbridge 735 to other forms of storage devices, such as hard disk drives. Audio circuitry 760, such as a sound card, connects to Southbridge 735 via bus 758. Audio circuitry 760 also provides functionality such as audio line-in and optical digital audio in port 762, optical digital output and headphone jack 764, internal speakers 766, and internal microphone 768. Ethernet controller 770 connects to Southbridge 735 using a bus, such as the PCI or PCI Express bus. Ethernet controller 770 connects information handling system 700 to a computer network, such as a Local Area Network (LAN), the Internet, and other public and private computer networks.

While FIG. 7 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 795) shown in FIG. 7 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 8.

Figure 8:
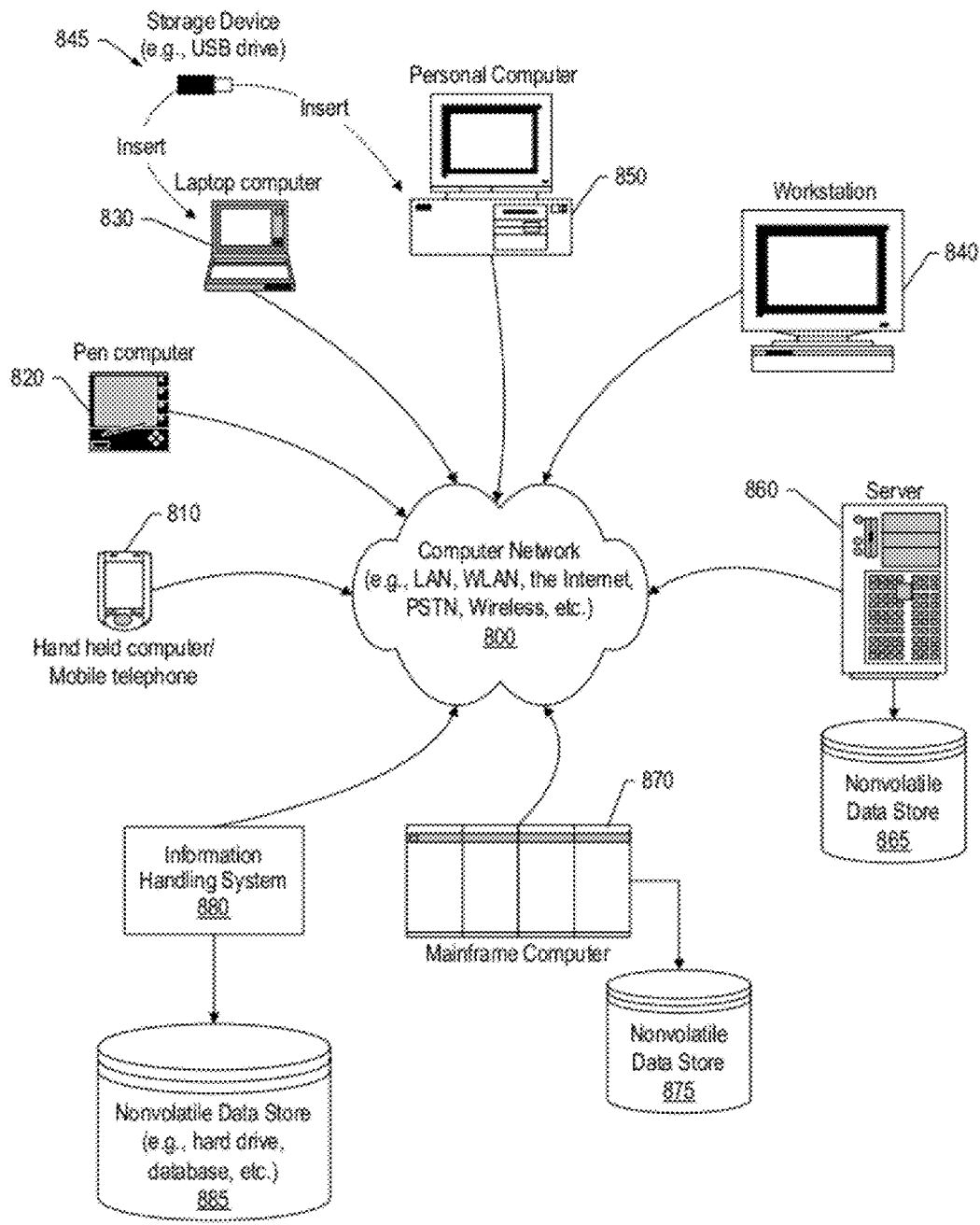
FIG. 8 provides an extension of the information handling system environment shown in FIG. 7 to illustrate that the methods described herein can be performed on a wide variety of information handling systems which operate in a networked environment.

FIG. 8 provides an extension of the information handling system environment shown in FIG. 7 to illustrate that the methods described herein can be performed on a wide variety of information handling systems that operate in a networked environment. Types of information handling systems range from small handheld devices, such as handheld computer/mobile telephone 810 to large mainframe systems, such as mainframe computer 870. Examples of handheld computer 810 include personal digital assistants (PDAs), personal entertainment devices, such as MP3 players, portable televisions, and compact disc players. Other examples of information handling systems include pen, or tablet, computer 820, laptop, or notebook, computer 830, workstation 840, personal computer system 850, and server 860. Other types of information handling systems that are not individually shown in FIG. 8 are represented by information handling system 880. As shown, the various information handling systems can be networked together using computer network 800. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 8 depicts separate nonvolatile data stores (server 860 utilizes nonvolatile data store 865, mainframe computer 870 utilizes nonvolatile data store 875, and information handling system 880 utilizes nonvolatile data store 885). The nonvolatile data store can be a component that is external to the various information handling systems or can be internal to one of the information handling systems. In addition, removable nonvolatile storage device 745 can be shared among two or more information handling systems using various techniques, such as connecting the removable nonvolatile storage device 745 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
monitoring real-time condition data by a processor, the real-time condition data including environmental data that corresponds to an ambient environmental condition of a system;
receiving a policy change threshold at the processor, the policy change threshold corresponding to the ambient environmental condition of the system;
determining, by the processor, whether the real-time condition data has reached the policy change threshold;
in response to determining that the real-time condition data has not reached the policy change threshold, generating, by the processor, a maintenance operation notification based upon the real-time condition data according to a maintenance schedule policy, the maintenance schedule policy corresponding to a first carbon generation rate produced by the system; and
in response to determining that the real-time condition data has reached the policy change threshold, generating, by the processor, an alternate maintenance operation notification based upon the real-time condition data according to an alternate maintenance schedule policy, wherein the alternative maintenance schedule policy corresponds to a second carbon generation rate produced by the system that increases an overall time for the system to reach a maximum carbon footprint threshold.

2. The method of claim 1 wherein the policy change threshold corresponds to a carbon footprint threshold, and wherein:
the system produces a carbon footprint at the first carbon generation rate in response to servicing the system according to the maintenance schedule policy; and
the system produces the carbon footprint at the second carbon generation rate in response to servicing the system according to the alternate maintenance schedule policy, wherein the second carbon generation rate is less than the first carbon generation rate.

3. The method of claim 1 wherein the alternative maintenance schedule policy, when compared to the maintenance schedule policy, shortens a component change interval of a component.

4. The method of claim 1 wherein the system is a transportation vehicle that is selected from the group consisting of an automobile, a truck, a train, and an aircraft.

5. The method of claim 1 wherein the real-time condition data includes component data and cost data, the component data indicating a condition of a component included in the system and the cost data indicating a current cost of the component utilized in the system.

6. The method of claim 5 further comprising:
analyzing current operational costs corresponding to the system;
identifying potential operational costs corresponding to replacing the component;
computing an operational cost difference based upon the current operational costs and the potential operational costs;
identifying a replacement cost to replace the component, the current cost of the component included in the replacement cost; and
replacing the component in response to determining that the replacement cost is less than the operational cost difference.

7. The method of claim 1 further comprising:
receiving the maintenance schedule at the system from a remote maintenance manager; and
in response to determining that the real-time condition data has reached the policy change threshold:
requesting, by the system, the alternate maintenance schedule policy from the remote maintenance manager; and
receiving, from the remote maintenance manager, the alternate maintenance schedule policy at the system.

8. The method of claim 1 further comprising:
terminating operation of the system in response to determining that the real-time condition data has reached the policy change threshold.

9. An information handling system comprising:
one or more processors;
a memory coupled to at least one of the processors;
a set of computer program instructions stored in the memory and executed by at least one of the processors in order to perform actions of:
monitoring real-time condition data by a processor, the real-time condition data including environmental data that corresponds to an ambient environmental condition of a system;
receiving a policy change threshold at the processor, the policy change threshold corresponding to the ambient environmental condition of the system;
determining, by the processor, whether the real-time condition data has reached the policy change threshold;
in response to determining that the real-time condition data has not reached the policy change threshold, generating, by the processor, a maintenance operation notification based upon the real-time condition data according to a maintenance schedule policy, the maintenance schedule policy corresponding to a first carbon generation rate produced by the system; and
in response to determining that the real-time condition data has reached the policy change threshold, generating, by the processor, an alternate maintenance operation notification based upon the real-time condition data according to an alternate maintenance schedule policy, wherein the alternative maintenance schedule policy corresponds to a second carbon generation rate produced by the system that increases an overall time for the system to reach a maximum carbon footprint threshold.

10. The information handling system of claim 9 wherein the policy change threshold corresponds to a carbon footprint threshold, and wherein:
the system produces a carbon footprint at the first carbon generation rate in response to servicing the system according to the maintenance schedule policy; and
the system produces the carbon footprint at the second carbon generation rate in response to servicing the system according to the alternate maintenance schedule policy, wherein the second carbon generation rate is less than the first carbon generation rate.

11. The information handling system of claim 9 wherein:
- the alternative maintenance schedule policy, when compared to the maintenance schedule policy, shortens a component change interval of a component; and
- the system is a transportation vehicle that is selected from the group consisting of an automobile, a truck, a train, and an aircraft.

12. The information handling system of claim 9 wherein the real-time condition data includes component data and cost data, the component data indicating a condition of a component included in the system and the cost data indicating a current cost of the component utilized in the system.

13. The information handling system of claim 12 and wherein the processors perform additional actions comprising:
- analyzing current operational costs corresponding to the system;
- identifying potential operational costs corresponding to replacing the component;
- computing an operational cost difference based upon the current operational costs and the potential operational costs;
- identifying a replacement cost to replace the component, the current cost of the component included in the replacement cost; and
- replacing the component in response to determining that the replacement cost is less than the operational cost difference.

14. A computer program product stored in a computer readable storage medium, comprising computer program code that, when executed by an information handling system, causes the information handling system to perform actions comprising:
- monitoring real-time condition data by a processor, the real-time condition data including environmental data that corresponds to an ambient environmental condition of a system;
- receiving a policy change threshold at the processor, the policy change threshold corresponding to the ambient environmental condition of the system;
- determining, by the processor, whether the real-time condition data has reached the policy change threshold;
- in response to determining that the real-time condition data has not reached the policy change threshold, generating, by the processor, a maintenance operation notification based upon the real-time condition data according to a maintenance schedule policy, the maintenance schedule policy corresponding to a first carbon generation rate produced by the system; and
- in response to determining that the real-time condition data has reached the policy change threshold, generating, by the processor, an alternate maintenance operation notification based upon the real-time condition data according to an alternate maintenance schedule policy, wherein the alternative maintenance schedule policy corresponds to a second carbon generation rate produced by the system that increases an overall time for the system to reach a maximum carbon footprint threshold.

15. The computer program product of claim 14 wherein the policy change threshold corresponds to a carbon footprint threshold, and wherein:
- the system produces a carbon footprint at the first carbon generation rate in response to servicing the system according to the maintenance schedule policy; and
- the system produces the carbon footprint at the second carbon generation rate in response to servicing the system according to the alternate maintenance schedule policy, wherein the second carbon generation rate is less than the first carbon generation rate.

16. The computer program product of claim 14 wherein:
- the alternative maintenance schedule policy, when compared to the maintenance schedule policy, shortens a component change interval of a component; and
- the system is a transportation vehicle that is selected from the group consisting of an automobile, a truck, a train, and an aircraft.

17. The computer program product of claim 14 wherein the real-time condition data includes component data and cost data, the component data indicating a condition of a component included in the system and the cost data indicating a current cost of the component utilized in the system, and wherein the information handling system performs further actions comprising:
- analyzing current operational costs corresponding to the system;
- identifying potential operational costs corresponding to replacing the component;
- computing an operational cost difference based upon the current operational costs and the potential operational costs;
- identifying a replacement cost to replace the component, the current cost of the component included in the replacement cost; and
- replacing the component in response to determining that the replacement cost is less than the operational cost difference.

* * * * *